April 2, 1968

SABURO MIYATA 3,376,529

MAGNET ASSEMBLY FOR FILTERING

Filed June 2, 1965

INVENTOR
SABURO MIYATA
BY Chandlee Pidgeon
AGENT

United States Patent Office 3,376,529
Patented Apr. 2, 1968

3,376,529
MAGNET ASSEMBLY FOR FILTERING
Saburo Miyata, 58 Shimo Takanawa, Minato-ku,
Yokohama, Japan
Filed June 2, 1965, Ser. No. 460,673
10 Claims. (Cl. 335—305)

ABSTRACT OF THE DISCLOSURE

A longitudinally extending series of magnets, comprising discs or spheres having magnetic poles in line with the direction of the length of the series is provided with intermediate pole pieces which embrace and substantially enclose the polar area of an adjacent magnet. The pole pieces between pairs of magnets embrace polar areas of two magnets and end pole pieces embrace the end polar area of the first and last magnets of the series. Like poles face one another. A sleeve of non-magnetic material surrounds and supports the series of magnets and pole pieces.

---

This invention relates to a magnet assembly for filtering and is representative of means adapted to be used in various situations where fluids or fluent materials may be caused to pass over or about the magnet assembly for the removal of ferromagnetic particles which may be present in such fluent materials.

An object of this invention is the provision of a magnet assembly having means for controlling the magnetic flux to produce areas of very high flux density.

Another object of this invention is the provision of a magnet assembly wherein the flux from each pole is concentrated in a pole piece for that pole and wherein the air gap is very small compared to other dimensions.

A further object of this invention is the provision of a magnet assembly wherein nearly all the flux from one pole is concentrated in a single pole piece.

These and other objects will become apparent from a consideration of the following specification taken with the accompanying drawings, which together form a complete disclosure of the invention.

In the drawings, wherein like characters of reference indicate like parts throughout the several figures.

Figure 1:
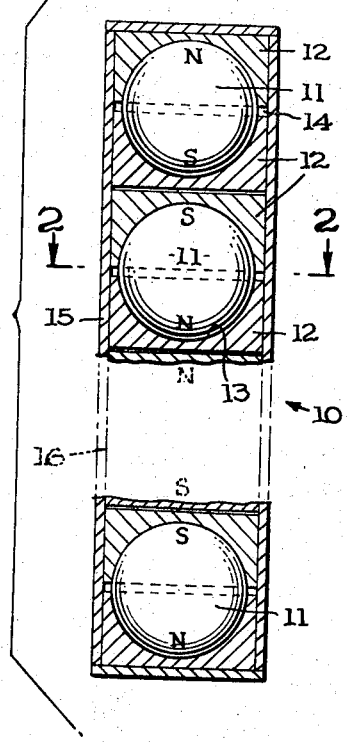
FIG. 1 is a central longitudinal section through one form of the assembly.

Referring now to FIG. 1, numeral 10 indicates a form of the magnet assembly. The assembly 10 comprises a plurality of spherical magnets 11, each magnetized on a diameter. Each magnet 11 is provided with a pair of identical pole pieces 12, formed of mild steel, and each having a spherical depression 13 of a radius corresponding to the radius of the spherical magnet 11. The depth of the depression 13 in each pole piece is slightly less than the radius of the spherical magnet 11, such that, for example, with magnets having a diameter of about 25 mm., there will be a gap 14 between pole pieces 12 of about 1 mm. The magnets with their pole pieces are assembled in a tube or sleeve 15 of plastic material or non-ferrous metal. In FIG. 1, the sleeve 15 is shown broken at 16, to indicate that the length thereof is indefinite, and is dependent on circumstances. In order to further concentrate the magnetic flux, the magnets 11 and pole pieces 12 are arranged in the sleeve 15 with like poles closely adjacent one another. Thus two N. poles will be opposite one another, as will two S. poles. In order to prevent any tendency of the sperical magnets to change orientation, they are preferably cemented to the pole pieces, and the combined magnet 11 and pole pieces 12 are preferably cemented in the sleeve 15.

The magnets 11 of this invention are preferably formed of a sintered ferrite, and Barium Ferrite, $BaO \cdot Fe_2O_3$ is considered particularly useful, since when sintered and formed into desired shapes it can be magnetized on any desired axis to produce powerful magnets.

Figure 2:
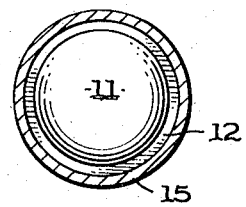
FIG. 2 is a section taken substantially on the line 2—2 of FIG. 1.
Figure 3:
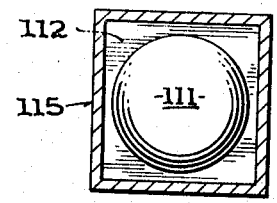
FIG. 3 is a section similar to FIG. 2 showing a slightly modified construction.

The construction shown in FIGS. 1 and 2 is based on a cylindrical sleeve 15 and cylindrical pole pieces 12. In FIG. 3, the tube 115 may be polygonal, and is here shown as square. The pole piece 112 is prismatic, but the magnet 111 is the same as the magnet 11.

Figure 4:
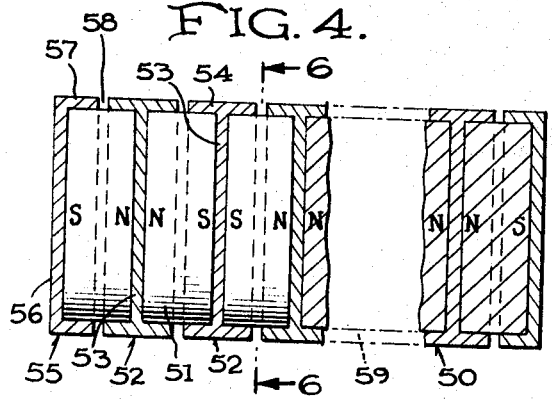
FIG. 4 is a modified form of the device in longitudinal section.
Figure 5:
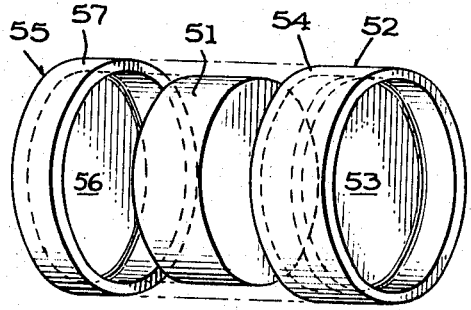
FIG. 5 is an exploded axonometric view.
Figure 6:
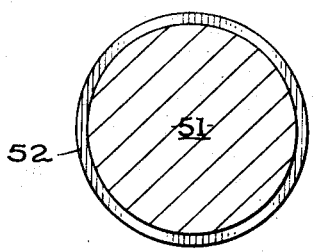
FIG. 6 is a section substantially on the line 6—6 of FIG. 4.

In FIGS. 4 to 6 there is shown a further modification including a magnet assembly 50 having disc or wafer magnets 51 and ring pole pieces 52 of mild steel having T-shaped cross sections. The magnets 51 are preferably formed of a sintered ferrite as described for the magnets 11, and are magnetized along their axes. The arrangement is such that two north poles face the web 53 of one pole piece, and two south poles face the web 53 of an adjacent pole piece 52. The cylindrical portion or T-bar 54 of each pole piece 52 overlies the periphery of the magnet 51 to almost half the thickness of the magnet 51. The proportion is such that for a magnet 51 having a diameter of about 25 mm. the gap 58 between pole pieces 52 will be about 1 mm. At either end of an array of magnets 51 and pole pieces there is an end pole piece 55 in the form of a cup having a bottom 56 and a side wall 57, which latter overlies a portion of the end magnet 51. The assembly in FIG. 4 is shown broken as at 59 to indicate indefinite length, which may be adapted to circumstances.

In view of the inherent reactions in a structure of this nature, the magnets are preferably cemented to the pole pieces by means such as an epoxy resin cement. The gaps 58 may be filled with cement and the assembly may be used as is, or it may be enclosed in a tube or sheath similar to the sheath 15.

The devices of this application may be used in lieu of the devices of the prior application of S. M. Moriya, S. N. 350,796, filed Mar. 10, 1964, now abandoned, or the device of the application of S. M. Moriya, S.N. 316,823, filed Oct. 17, 1963, now Patent 3,278,797 or the device of the application of S. M. Moriya, S. N. 100,564, filed Apr. 4, 1961, now Patent 3,206,657. It has therefore been deemed unnecessary to show any adaptations of the device for various filtering situations. Skilled artisans in the filtering arts can obviously work out many adaptations.

Having now described my invention in several aspects, I desire it to be understood that various changes may be made within the skill of the arts and the scope of the appended claims.

I claim:

1. In a magnet assembly for filtering, a plurality of sequentially arranged axially aligned discrete magnets having axially directed polar axes providing axially spaced polar areas, a plurality of pole pieces disposed between and embracing the major portion of the pole area of adjacent magnets, each pole piece extending toward another just short of touching, to provide a very narrow air gap between pole pieces.

2. The magnet assembly as defined in claim 1 wherein the magnets are spheres and wherein the pole pieces are non-spherical solids each having a spherical depression therein of a radius substantially the radius of the spherical magnet.

3. The magnet assembly as defined in claim 2, wherein like poles face one another in the assembly.

4. The magnet assembly as defined in claim 2 wherein there is a gap between pole pieces of approximately 1/25 the diameter of the magnets.

5. The magnet assembly as defined in claim 2 wherein the pole pieces are cylindrical.

6. The magnet assembly as defined in claim 2 including a sleeve of non-ferrous material supporting and confining the magnets and pole pieces.

7. The structure as defined in claim 1 wherein the magnets are discs axially magnetized and the pole pieces are rings having T-shaped cross section, with the T-bars embracing all but a very minor portion of the polar area of a pole.

8. The magnet assembly as defined in claim 7 including air gaps between the pole pieces, and wherein the gaps are approximately 1/25 the diameter of the magnets.

9. The magnet assembly as defined in claim 7 wherein the end pole pieces of the assembly are cups.

10. The structure as defined in claim 1 wherein each magnet is a solid of revolution.

References Cited

UNITED STATES PATENTS

| | | | |
|---|---|---|---|
| 2,678,729 | 5/1954 | Spondig | 317—201 X |
| 2,975,497 | 3/1961 | Budreck | 317—201 X |
| 3,062,376 | 11/1962 | Davis | 317—201 X |
| 3,206,657 | 9/1965 | Moriya | 317—201 |

BERNARD A. GILHEANY, *Primary Examiner.*

GEORGE HARRIS, *Examiner.*

H. A. LEWITTER, *Assistant Examiner.*